(12) United States Patent
Hebensperger et al.

(10) Patent No.: US 9,139,281 B2
(45) Date of Patent: Sep. 22, 2015

(54) AIR VEHICLE WITH A SLIP PROTECTING AND GAS SEALING COMPOSITE FLOOR

(71) Applicant: AIRBUS HELICOPTERS DEUTSCHLAND GMBH, Donauworth (DE)

(72) Inventors: Michael Hebensperger, Munich (DE); Wolfgang Kreitmair-Steck, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 312 days.

(21) Appl. No.: 13/679,079

(22) Filed: Nov. 16, 2012

(65) Prior Publication Data

US 2013/0264423 A1    Oct. 10, 2013

(30) Foreign Application Priority Data

Nov. 22, 2011  (EP) .................................... 11400057

(51) Int. Cl.
| | | |
|---|---|---|
| *B64C 1/18* | (2006.01) | |
| *B32B 15/08* | (2006.01) | |
| *B32B 3/12* | (2006.01) | |
| *B32B 3/30* | (2006.01) | |
| *B32B 27/12* | (2006.01) | |

(52) U.S. Cl.
CPC ... *B64C 1/18* (2013.01); *B32B 3/12* (2013.01); *B32B 3/30* (2013.01); *B32B 15/08* (2013.01); *B32B 27/12* (2013.01); *B32B 2250/40* (2013.01); *B32B 2274/00* (2013.01); *B32B 2307/7242* (2013.01); *B32B 2307/744* (2013.01); *B32B 2605/003* (2013.01); *B32B 2605/18* (2013.01)

(58) Field of Classification Search
CPC ............................ B32B 2307/744; B64C 1/18
USPC .......................................... 428/116; 52/403.1
See application file for complete search history.

(56) References Cited

U.S. PATENT DOCUMENTS

| | | | |
|---|---|---|---|
| 8,025,959 B2 * | 9/2011 | Hashiba et al. ............. | 428/300.7 |
| 8,640,590 B2 * | 2/2014 | Holowczak et al. ......... | 89/36.02 |
| 2006/0000186 A1 * | 1/2006 | Carlson et al. ............... | 52/793.1 |
| 2006/0138279 A1 | 6/2006 | Pisarski | |
| 2007/0102239 A1 | 5/2007 | Liguore | |
| 2009/0072086 A1 | 3/2009 | Smith | |
| 2013/0205982 A1 * | 8/2013 | Walter et al. ................ | 89/36.02 |

FOREIGN PATENT DOCUMENTS

| | | |
|---|---|---|
| DE | 102005023320 A1 | 11/2006 |
| WO | 2006122749 A1 | 11/2006 |

OTHER PUBLICATIONS

Search Re[prt and Written Opinion; Application No. EP 10400057; dated May 21, 2012.

* cited by examiner

*Primary Examiner* — Brian M O'Hara
*Assistant Examiner* — Michael Kreiner
(74) *Attorney, Agent, or Firm* — Brooks Kushman P.C.

(57) ABSTRACT

An air vehicle, particularly a helicopter, includes a slip protecting and gas sealing composite floor inside a fuselage. The slip protecting and gas sealing composite floor is built up of a profiled elastomer layer provided at its bottom side with a cross-linking agent, n-layers of a further component or a variety of different components and partially thermosetting resin covered by a profiled elastomer layer, a honey comb layer and lower n-layers of the further component or variety of different components and partially thermosetting resin, the honey comb layer being sandwiched between the n-layers and the lower n-layers.

20 Claims, 3 Drawing Sheets

AIR VEHICLE WITH A SLIP PROTECTING AND GAS SEALING COMPOSITE FLOOR

CROSS REFERENCE TO RELATED APPLICATIONS

This application claims priority to European patent application No. 11 400057.3 filed Nov. 22, 2011, the disclosure of which is incorporated in its entirety by reference herein.

BACKGROUND OF THE INVENTION (1) Field of the Invention

The invention relates to an air vehicle with a slip protecting and gas sealing composite floor inside a fuselage, the composite floor including at least one profiled elastomer layer provided at its bottom side with a cross-linking agent, one or n-layers of a further component or a variety of further components and partially thermosetting resin covered by the profiled elastomer layer, a honey comb layer and one lower layer or lower n-layers of the further component or a variety of further components and partially thermosetting resin, the honey comb layer being sandwiched between the n-layers and the lower n-layers.

(2) Description of Related Art

Current floor structures for transport aircrafts are either complex and expensive for production or their weight is a significant limitation. The number of different production steps for said floor structures is fairly high. If there is a need for slip protection or for sealing of a fuselage against gases by means of said floor structures expensive and laborious treatment of the floor is needed.

Efficient slip protection requires a detailed knowledge of the slipping process and the mechanisms involved in the reduction of the slipping risk on floors. The most important forces to be considered result from adhesive friction and/or deformation friction:

adhesive friction is dependent on the effective area of contact between the floor, the object on top of the floor (shoe, box etc.) and on the properties of the two materials—a less effective area results in less friction and therefore more risk of slippage, deformation friction occurs if visco-elastic materials are involved and is dependent on the visco-elastic properties of the materials and the profiles of both surfaces—more visco-elasticity and more profiles result in increased contact area and consequently less risk for slippage If there is an intermediate medium involved such as water, ice, mud, oil etc., there is—dependent on the thickness of the layer—a change from adhesive friction to fluid friction, which of course is dependent on the viscosity of the intermediate medium, the area of contact, etc.

National regulations, e.g. German regulations, make assumptions and provide requirements for slip protection at various places and environments. Said regulations could be applied as rules of thumb for slippage protection for floors of transport helicopters and transport aircraft:

For open air pathways without protective roof, loading ramps, and washrooms the German regulations require:

way out space for at least 4 $cm^3/dm^2$ liquid on the floor and no slipping if there is an inclination of the floor of between 10° and 19°.

For floor panels in aircraft there can be different techniques applied, dependent on the exact requirements: the basic decision is between normal sheets, such as metal or composite, and sandwich structures involving honeycomb components. The exact strength of such a floor panel is dependent—amongst others—on its exact set up, such as material, thickness of layers and honeycomb, etc.

The slip properties of the floor panels are dependent on the material on the top of the floor panels as well as on the roughness/surface structuring.

The following options are realized for different purposes:
resin treated material on top,
metal on top,
glued slip protection foils,
rolled on protection material.

Disadvantages of Resin Treated Material on Top:

resin treated material normally is very sensitive against any kind of impact during a loading/unloading process. The resin can chip of easily and therefore floor panels made of resin treated material normally have a short lifetime, the shaping of the surface in order to satisfy the requirements for slip protection above is not easy to realize, the resin treated material is not visco-elastic and provides no or very low deformation friction the floor panels need to be painted in an additional process step and the sealing against gases is independent of slip protection and requires additional efforts.

Disadvantages of Metal on Top:

if the metal is aluminum, the shaping of the surface in order to satisfy the above mentioned requirements for slip protection requires casting or milling techniques. Said techniques are very time consuming and expensive, if the metal is iron, the shaping can be done easily but the resulting weight of the floor is fairly high, the material is not visco-elastic and provides no or very low deformation friction, if fiber material is involved, the composite structures need to be painted in an additional process step, and the sealing against gases is independent of slip protection and requires additional efforts.

Disadvantages of Glued Slip Protection Foils:

if fiber material is involved, the glued slip protection foils of the floor panels need to be painted in an additional process step, the glued slip protection foils require additional and labour-intensive production steps, the glued slip protection foils need to be produced in a separate production process, and the sealing against gases is independent from slip protection and requires additional effort.

Disadvantages of Rolled on Protection Material:

if fiber material is involved, the rolled on protection material of the floor panels need to be painted in an additional process step, rolled on protection material requires additional and labour-intensive production steps, and the sealing against gases is independent from slip protection and requires additional efforts.

The document US 2009072086 A1 discloses an aircraft floor and interior panels where core-skin bonding is improved between honeycomb and composite face sheets (skins) by applying a polyamide and/or rubber-containing adhesive to the edge of the honeycomb prior to bonding. Edge coating of the honeycomb allows one to reduce panel weight without reducing the performance parameters that are required for different types of aircraft floor and interior panels.

The document US 2006138279 A1 discloses an aircraft floor panel for installation in a to-be-heated area of an aircraft. The panel comprises a panel-supporting level, a heat-generating level, and an upper level having an upper surface that forms the uppermost surface of the panel. A thermally conductive layer within the upper level comprises strength-imparting elements embedded in a matrix. This layer provides the primary impact-resistance for the panel and also serves as its heat-distributing layer.

The document US 2007102239 A1 discloses an aircraft floor panel comprising a honeycomb core element having an upper core surface, a lower core surface, and a core thickness. An upper face sheet assembly is mounted to and seals the upper core surface and includes at least one upper material sheet impregnated with an upper epoxy resin. A lower damping face sheet assembly is mounted to and seals the lower core surface and includes at least one lower material sheet infused with a highly damped lower epoxy resin. The lower damping face sheet assembly dampens vibrational noise.

The document WO 2006122749 A1 discloses a composite structure which comprises at least two layers. A first layer consists at least partially of a thermosetting resin and a second layer consists at least partially of an elastomer that is provided with a cross-linking agent. The at least one first layer consisting at least partially of a thermosetting resin and the at least one second layer consisting at least partially of an elastomer that is provided with a cross-linking agent are joined by a common heat treatment or another cross-linking treatment in one step. Said composite structure is used as a light weight vibration damper for interior panelling of a vehicle.

It is an objective of the invention to provide for an air vehicle with a slip protecting and gas sealing composite floor inside a fuselage that is adaptable to different requirements concerning slip protection for persons and material as well as sealing against gas penetration. It is a further objective of the invention to provide for an air vehicle with a slip protection of the floor for different soiling types, such as water, snow/ice, soil particles etc. . . . It is a still further objective of the invention to provide for an air vehicle with a floor structure as light as possible. It is a still further objective of the invention to provide for an air vehicle with a floor structure resistant against crash, hard impacts, and abrasion caused by careless loading/unloading of material.

The solution to this objective is provided with an air vehicle with a slip protecting and gas sealing composite floor inside a fuselage, the composite floor including at least one profiled elastomer layer provided at its bottom side with a cross-linking agent, one or n-layers of a further component or a variety of further components and partially thermosetting resin covered by the profiled elastomer layer, a honey comb layer and one lower layer or lower n-layers of the further component or a variety of further components and partially thermosetting resin, the honey comb layer being sandwiched between the n-layers and the lower n-layers. Advantageous embodiments of the invention are provided with the sub-claims.

BRIEF SUMMARY OF THE INVENTION

According to the invention an air vehicle with a slip protecting and gas sealing composite floor or a slip protecting and gas sealing composite floor panel inside a fuselage is provided, particularly a helicopter with a slip protecting and gas sealing composite floor inside a fuselage. Said slip protecting and gas sealing composite floor is built up of a profiled elastomer layer provided at its bottom side with a cross-linking agent, a further component of n-layers and partially thermosetting resin covered by said profiled elastomer layer, a honey comb layer and a further component of lower n-layers and partially thermosetting resin. Said honey comb layer is sandwiched between said n-layers and said lower n-layers. The inventive air vehicle is provided with an efficient slip protecting and gas sealing composite floor inside a fuselage due to the optimized kind of material used. The elasticity of the surface as well as the structuring of the surface and roughness of the floor allows safe interaction of shoes and boots with different kinds of soles, as well as metal/plastic/wooden boxes/containers with the aircraft floor. The slip protecting and gas sealing composite floor of the invention allows cure of the complete floor or of the floor panels for an inventive air vehicle in one production step by enclosing a sequence of layers into a curing form to thermally treat them. This thermal treatment starts a vulcanization process for the elastomer layer(s), a hardening process for the resin and at the same time a chemical reaction between resin and elastomer which creates an indestructible combination of the resin and the elastomer. During vulcanization, the top layer elastomer can be shaped already in such a way, that its surface structure is appropriate to provide the necessary escape space for any liquids or greasy pollutants, such as water, snow, mud etc., and thus providing the efficient slip protecting and gas sealing composite floor. The elastomer layer as a top layer provides the necessary visco-elasticity for increasing the contact area between the floor and the material/shoe soles on top of the slip protecting and gas sealing composite floor with the above mentioned efficient friction level. At the same time, by using the elastomer in the proposed way, the slip protecting and gas sealing composite floor achieves the required gas isolation properties.

According to a preferred embodiment of the invention an elastomer layer is provided below said lower n-layers, said elastomer layer being provided at its upper side with a cross-linking agent.

According to a further preferred embodiment of the invention the bottom side of the plurality of lower n-layers is provided with a primer for protection of the slip protecting and gas sealing composite floor against humidity instead of an elastomer layer. Said primer has less weight than said elastomer layer.

According to a further preferred embodiment of the invention the n-layers and/or lower n-layers are made of fabric or preferably one sheet metal/metal foil for a less complex production of the slip protecting and gas sealing composite floor.

According to a further preferred embodiment of the invention the profiled elastomer layer is provided over its entire upper side with equal square shaped protrusions.

According to a further preferred embodiment of the invention the profiled elastomer layer is provided over its entire upper side with equal dot shaped protrusions.

According to a further preferred embodiment of the invention the profiled elastomer layer is provided over its entire upper side with equal dove tail shaped protrusions.

According to a further preferred embodiment of the invention the vibration and sound levels inside the fuselage of the inventive air vehicle can be reduced by using several layers of elastomers which are intermixed into the sequence of n-layers and lower n-layers for the slip protecting and gas sealing composite floor.

According to a further preferred embodiment of the invention several layers of fiber tissue with an E-Module higher than 100 GPa, a tear strength of more than 2.5 GPa, and a breaking elongation of more than 2%, e.g. Aramid or Zenon, are each embedded into elastomer layers which are intermixed into the sequence of n-layers and lower n-layers to make the slip protecting and gas sealing composite floor crashworthy and ballistically secure.

BRIEF DESCRIPTION OF THE SEVERAL VIEWS OF THE DRAWINGS

Preferred embodiments of the invention are presented with reference to the enclosed description and attached drawings.

DETAILED DESCRIPTION OF THE INVENTION

Figure 1:
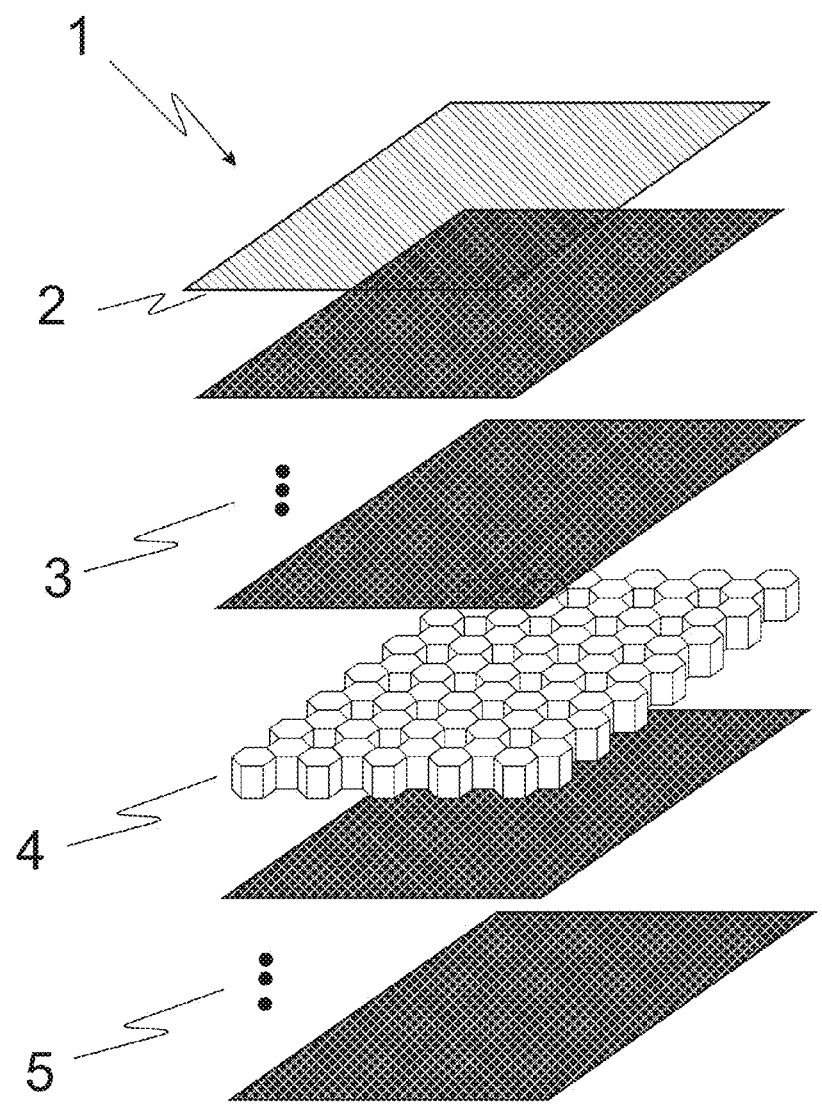
FIG. 1 shows a schematic view of a slip protecting and gas sealing composite floor for an air vehicle according to the invention.

According to FIG. 1 a slip protecting and gas sealing composite floor 1 for an air vehicle (not shown) is made of an upper profiled elastomer layer 2 provided at its bottom side with at least one cross-linking agent.

The upper profiled elastomer layer 2 covers one or n-layers 3 made of a fabric, elastomer or sheet metal/metal foils and at least partially thermosetting resin. The one or n-layers 3 of fabric, elastomer or sheet are made from metal, metal fibre, glass fibre, nylon fibre, carbon fibre, aramide or poly(p-phenylene-2,6-benzobisoxazole) fibre, etc. according to static or protective needs. Said one or n-layers 3 cover a honeycomb structure 4.

One or a plurality of lower layers 5, namely lower n-layers 5, are made of the fabric, elastomer or sheet metal/metal foils and the at least partially thermosetting resin. The honeycomb structure 4 is sandwiched between the one or plurality of layers 3 and the one or plurality of lower layers 5. A bottom side of the one or plurality of lower layers 5 is provided with a primer for protection of the slip protecting and gas sealing composite floor 1 against humidity. The primer may be a painting.

Figure 2:
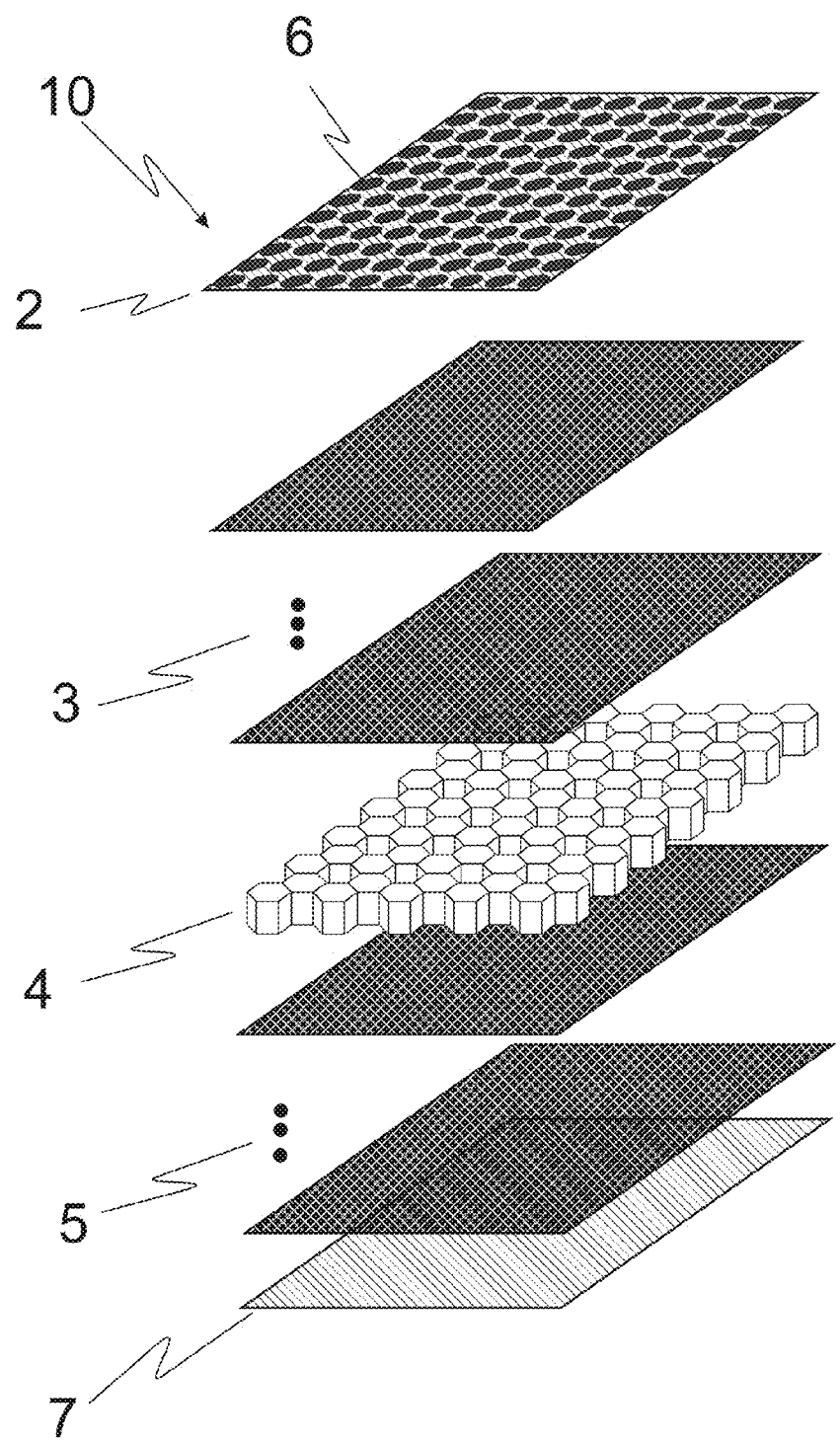
FIG. 2 shows a schematic view of a preferred embodiment of a slip protecting and gas sealing composite floor for an air vehicle according to the invention.

According to FIG. 2 corresponding features are referred to with the references of FIG. 1. A slip protecting and gas sealing composite floor 10 corresponds to the slip protecting and gas sealing composite floor 1 of FIG. 1 with the exception that the upper profiled elastomer layer 2 is provided at its upper side with equal dot shaped protrusions 6. The dot shaped protrusions 6 have a height of at least 0.6 mm and a radius of 3.15 mm and one hundred forty four of said dot shaped protrusions 6 are respectively regularly distributed over a surface of 100.00 mm×100.00 mm. The dot shaped protrusions 6 are shaped during thermal treatment of the profiled elastomer layer 2 in such a way that its upper surface structure is suited to provide the necessary escape space for any liquids or greasy pollutants. The dot shaped protrusions 6 are inserted/milled into the top curing form for moulding during thermal treatment of the upper profiled elastomer layer 2.

As a further exception the primer at the bottom side of the one or plurality of lower layers 5 of the slip protecting and gas sealing composite floor 1 is replaced for the slip protecting and gas sealing composite floor 10 by an elastomer layer 7 provided at its upper side with a cross-linking agent.

Figure 3:
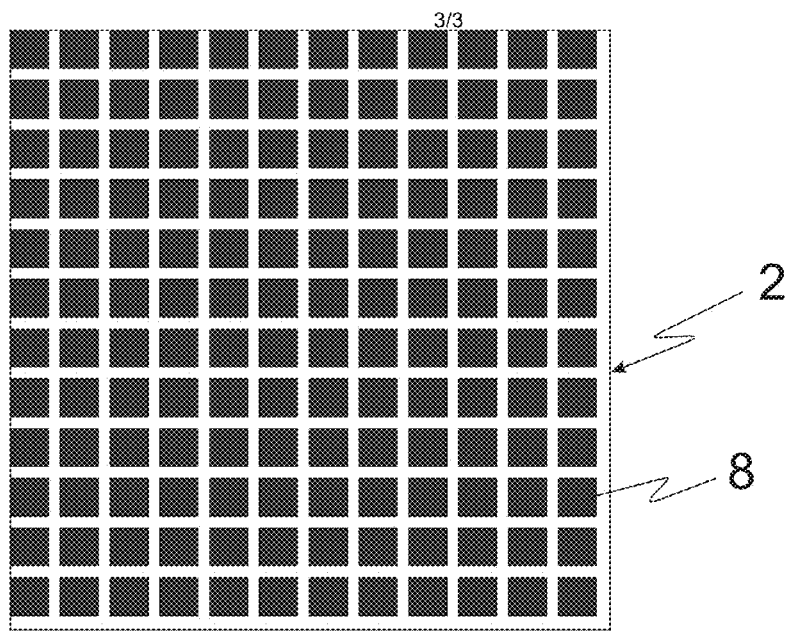
FIG. 3 shows a top view of a further preferred embodiment of a slip protecting and gas sealing composite floor for an air vehicle according to the invention.

According to FIG. 3 corresponding features are referred to with the references of FIGS. 1 and 2. The upper profiled elastomer layer 2 of the slip protecting and gas sealing composite floor 1, 10 is provided at its upper side with equal square shaped protrusions 8. The equal square shaped protrusions 8 have a height of at least 1.0 mm and a side length of 6.3 mm respectively regularly distributed over a surface of 100.00 mm×100.00 mm.

Figure 4:
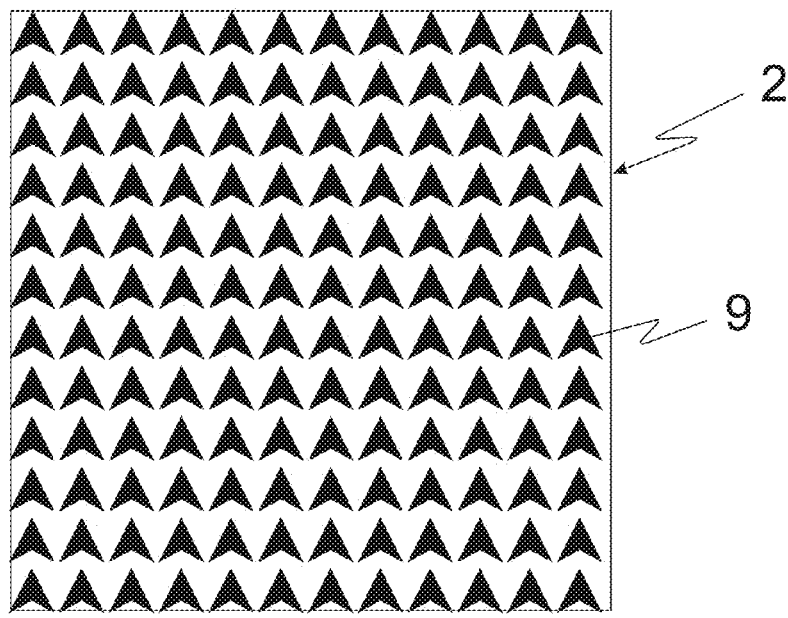
FIG. 4 shows a top view of a still further preferred embodiment of a slip protecting and gas sealing composite floor for an air vehicle according to the invention.

According to FIG. 4 corresponding features are referred to with the references of FIGS. 1 to 3. The upper profiled elastomer layer 2 of the slip protecting and gas sealing composite floor 1, 10 is provided at its upper side with equal dove tail shaped protrusions 9. The equal dove tail shaped protrusions 9 have a height of at least 0.6 mm and equal side lengths of 7.3 mm respectively regularly distributed over a surface of 100.00 mm×100.00 mm.

Vibration and sound levels inside the air vehicle can be reduced by inserting several layers of any of the un-profiled elastomer layers 2 or 7 into the sequence of n-layers 3 and/or lower n-layers 5 for the slip protecting and gas sealing composite floor 1, 10.

The slip protecting and gas sealing composite floor 1, 10 can be made crashworthy and ballistically secure by using several layers of fiber tissue with an E-Module higher than 100 GPa, a tear strength of more than 2.5 Gpa, and a breaking elongation of more than 2%, e.g. Aramid or Zenon, embedded between two elastomer layers 2, 7 within the sequence of n-layers 3 and/or lower n-layers 5.

REFERENCE LIST 1, 10 slip protecting and gas sealing composite floor
2 profiled elastomer layer
3 n-layers
4 honey comb layer
5 lower n-layers
6 dot shaped protrusions
7 elastomer layer
8 square shaped protrusions
9 dove tail shaped protrusions

What is claimed is:

1. An air vehicle having a fuselage and a slip-protecting and gas-sealing composite floor inside the fuselage, the slip-protecting and gas-sealing composite floor comprising:
    at least one elastomer layer, the elastomer layer being cured by thermal treatment and having a top surface and a bottom surface, the top surface being profiled with shaped protrusions for slip protection, the shaped protrusions being inserted or milled during the thermal treatment of the elastomer layer, the bottom surface being provided with a cross-linking agent,
    at least one upper sandwich layer having a further component and partially thermosetting resin, the upper sandwich layer being covered by the profiled elastomer layer,
    at least one lower sandwich layer having a further component and partially thermosetting resin,
    a honeycomb layer sandwiched between the at least one upper sandwich layer and the at least one lower sandwich layer, and
    a bottom layer to provide sealing protection of the composite floor.

2. The air vehicle according to claim 1, wherein the bottom layer includes a second elastomer layer below the at least one lower sandwich layer, the second elastomer layer being provided at its upper side with a cross-linking agent.

3. The air vehicle according to claim 1, wherein the bottom layer includes a respective layer of the at least one lower sandwich layer, the respective layer having a bottom side provided with a primer.

4. The air vehicle according to claim 1, wherein the at least one upper sandwich layer or the at least one lower sandwich layer is made of fabric or sheet metal/metal foil.

5. The air vehicle according to claim 1, wherein the at least one elastomer layer is provided over its upper side with equal square-shaped protrusions.

6. The air vehicle according to claim 1, wherein the at least one elastomer layer is provided over its upper side with equal dot-shaped protrusions.

7. The air vehicle according to claim 1, wherein the at least one elastomer layer is provided over its upper side with equal dovetail-shaped protrusions.

8. The air vehicle according to claim 1, wherein respective layers of the at least one elastomer layers are intermixed within the at least one upper sandwich layer or the at least one lower sandwich layer.

9. The air vehicle according to claim 1, further comprising at least one layer of fiber tissue with a Young's modulus higher than 100 GPa, a tear strength of more than 2.5 GPa, and a breaking elongation of more than 2% embedded between two respective layers of at least one elastomer layers which are intermixed within the at least one upper sandwich layer or the at least one lower sandwich layer.

10. The air vehicle of claim 1, wherein the at least one upper sandwich layer comprises a plurality of upper sandwich layers.

11. The air vehicle of claim 10, wherein the at least one lower sandwich layer comprises a plurality of lower sandwich layers.

12. The air vehicle of claim 1, wherein the slip-protecting and gas-sealing composite floor is cured as a unit with the at least one elastomer layer being vulcanized, the cross-linking agent being activated, and the resin being hardened by a common thermal treatment.

13. An air vehicle having a fuselage with a slip-protecting and gas-sealing composite floor inside the fuselage, the floor comprising, in order:
   an upper elastomeric layer with a top surface and a bottom surface, the top surface having shaped protrusions for slip protection, the bottom surface having a cross-linking agent disposed thereon;
   a plurality of upper sandwich layers comprising at least partially thermosetting resin;
   a honeycomb core;
   a plurality of lower sandwich layers comprising at least partially thermosetting resin; and
   a bottom layer configured to provide gas-sealing functionality.

14. The air vehicle of claim 13, wherein the bottom layer includes a lower elastomeric layer, the lower elastomeric layer having a top surface with a cross-linking agent disposed thereon.

15. The air vehicle of claim 13, further comprising an intermediate elastomeric layer disposed between respective layers of the plurality of upper sandwich layers or between respective layers of the plurality of lower sandwich layers.

16. The air vehicle of claim 13, wherein the bottom layer includes a respective layer of the plurality of lower sandwich layers, the respective layer having a bottom surface with a primer disposed thereon.

17. A method of manufacturing an anti-slip floor for a fuselage of an air vehicle, the method comprising:
   providing an uncured anti-slip floor having, in order, an upper elastomeric layer with a top surface and a bottom surface, at least one upper sandwich layer comprising at least partially thermosetting resin, a honeycomb core, and at least one lower sandwich layer comprising at least partially thermosetting resin, wherein the bottom surface has a cross-linking agent disposed thereon;
   forming shaped protrusions for slip protection on the top surface; and
   curing the anti-slip floor, wherein curing includes a thermal treatment to vulcanize the upper elastomeric layer, harden the resin, and cross-link the bottom surface with at least one of the plurality of upper sandwich layers.

18. The method of manufacturing an anti-slip floor of claim 17, wherein the at least one upper sandwich layer includes a plurality of upper sandwich layers and the at least one lower sandwich layer includes a plurality of lower sandwich layers.

19. The method of manufacturing an anti-slip floor of claim 17, wherein the uncured anti-slip floor further includes a lower elastomeric layer below the at least one lower sandwich layer, the lower elastomeric layer having a top surface with a cross-linking agent disposed thereon, and wherein the thermal treatment of the curing is further to vulcanize the lower elastomeric layer and cross-link the top surface of the lower elastomeric layer with the at least one lower sandwich layer.

20. The method of manufacturing an anti-slip floor of claim 17, wherein forming shaped protrusions on the top surface comprises molding protrusions onto the top surface.

\* \* \* \* \*